July 19, 1927. 1,636,478
E. E. MEISEKOTHEN
DRY BATTERY CONSTRUCTION
Filed April 8, 1925  3 Sheets-Sheet 1
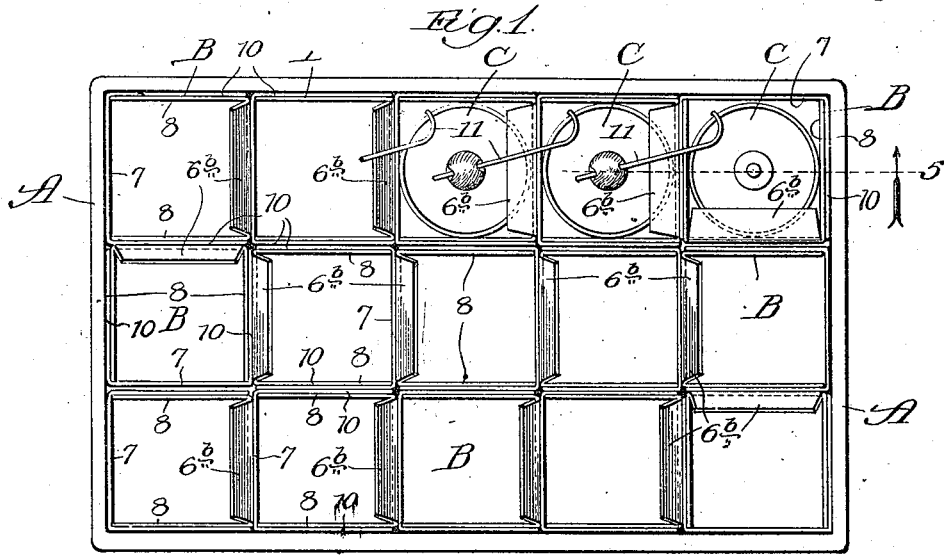
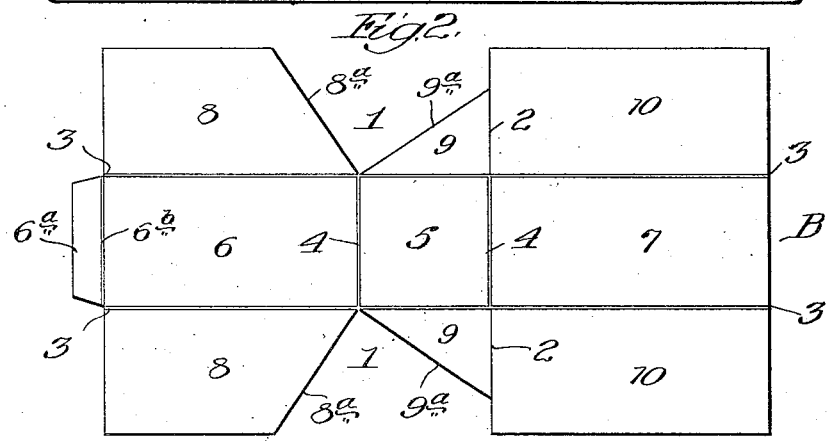
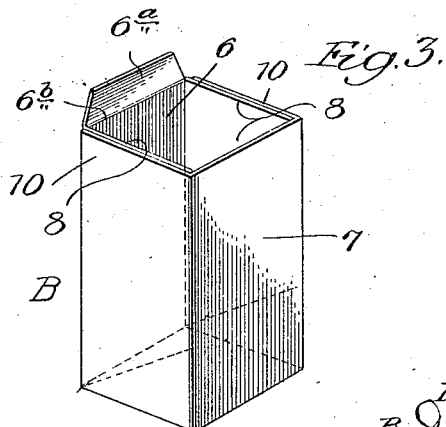
Inventor.
Edwin E. Meisekothen, July 19, 1927.

E. E. MEISEKOTHEN

DRY BATTERY CONSTRUCTION

Filed April 8, 1925  3 Sheets-Sheet 3

1,636,478

Inventor:
Edwin E. Meisekothen

Patented July 19, 1927.

1,636,478

UNITED STATES PATENT OFFICE.

EDWIN E. MEISEKOTHEN, OF MADISON, WISCONSIN, ASSIGNOR TO FRENCH BATTERY COMPANY, OF MADISON, WISCONSIN, A CORPORATION OF WISCONSIN.

DRY-BATTERY CONSTRUCTION.

Application filed April 8, 1925. Serial No. 21,501.

This invention relates particularly to dry battery construction; and the primary object is to provide an improved construction whereby dry cells may be cheaply assembled in a suitable container, and a durable battery, having the cells and connections well insulated, will be afforded.

In accordance with the invention, individual containers for the dry cells are provided. These individual containers are formed in an improved manner, and are nested in a suitable container. The dry cells are then introduced into the cell-cavities afforded by the individual containers, suitable connections are made between the dry cells, and a sealing compound is then poured in to fill the spaces about the cells and the space above the cells.

The invention is illustrated in its preferred embodiment in the accompanying drawings, in which—

Figure 4:
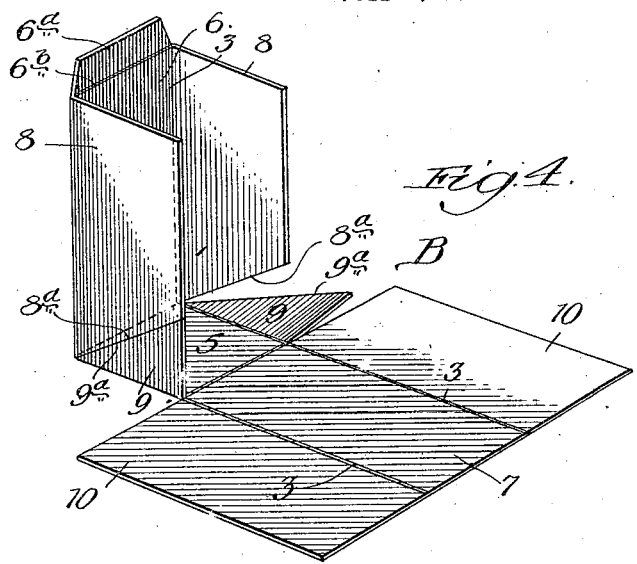
Figure 5:
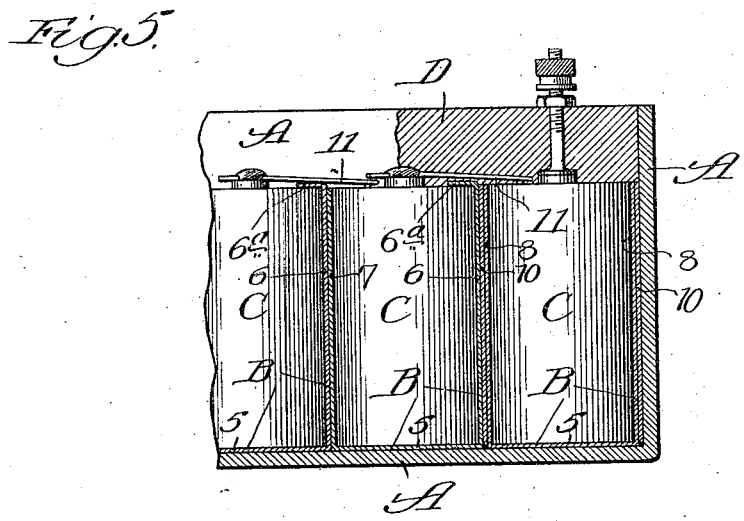
Figure 6:
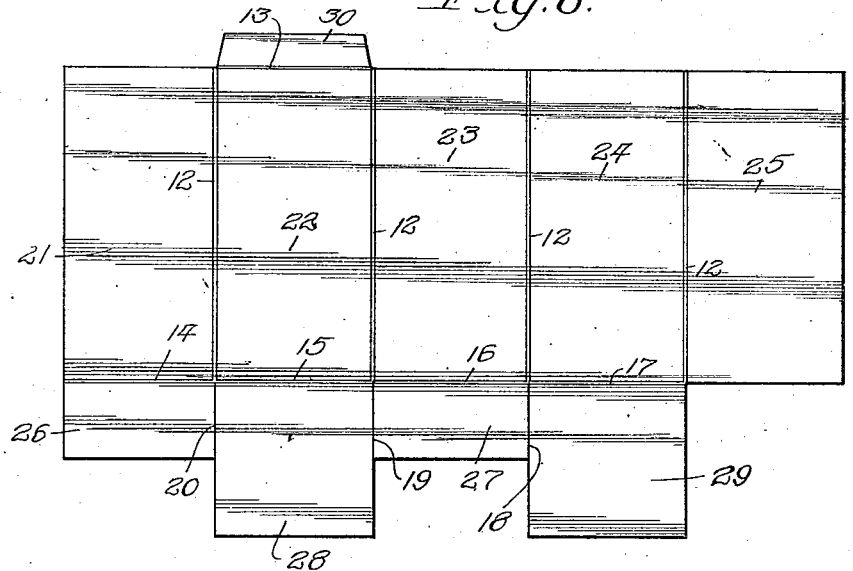
Figure 7:
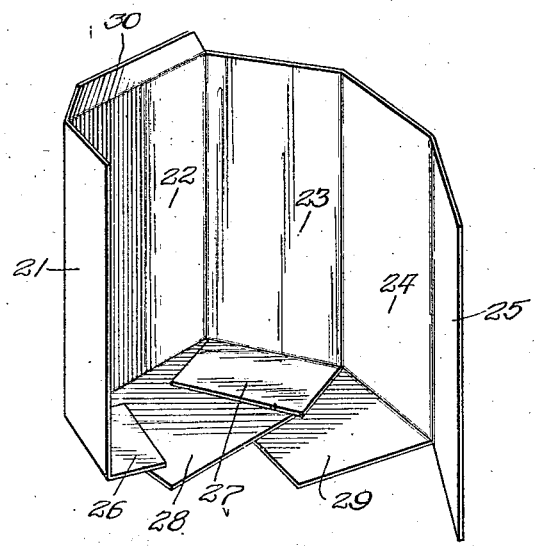

Fig. 1 represents a plan view of a battery constructed in accordance with the invention, only a few of the dry cells being shown in position and the sealing compound being omitted; Fig. 2, a plan view of a blank employed in forming the individual cell-container; Fig. 3, a perspective view of the cell-container formed by folding the blank shown in Fig. 2; Fig. 4, a perspective view of the blank in partially folded condition; Fig. 5, a broken vertical sectional view taken as indicated at line 5 of Fig. 1; Fig. 6, a plan view of another form of blank employed in forming an individual cell-container; Fig. 7, a perspective view of the blank in partially folded condition; and Fig. 8, a view of the same in completely folded condition.

In the construction illustrated, A designates a box-like container which may be formed of heavy cardboard, if desired; B designates individual cell-containers nested in the box A; C, C designates cells housed in the individual containers; and D designates a sealing compound filling the spaces about the dry cells and the space above the dry cells.

In Fig. 2, the individual cell-container B appears in the form of a blank, before folding; in Fig. 4, the blank is shown partially folded; and in Fig. 3, the blank is shown completely folded, thus forming the individual cell-container.

The individual cell-container preferably is formed of light cardboard, or heavy stiff paper. The blank comprises a strip, or rectangular, piece which has its lateral edges cut away, or notched, as indicated at 1. Slits are cut in the blank along the lines designated 2. Also, the blank is scored longitudinally along the two parallel lines 3—3, and also transversely along the two parallel lines designated 4 which intersect the lines 3—3. The scoring may be effected by a suitable press operation in such manner that the wings may be readily folded along the scored lines. Thus, the blank is divided into the central intermediate section 5 which forms the bottom of the cell-container; the flanking intermediate sections 6 and 7 which form two opposed sidewalls of the cell-container; the wing sections 8 which flank the section 6; the wing sections 9 which flank the bottom section 5; and the outer side-flaps 10 which flank the section 7. The notches, or recesses, 1, are so cut as to provide beveled edges $8^a$ for the lower ends of the side-flaps 8 and beveled edges $9^a$ for the complemental side-flaps 9. The bevels are such that when the flaps are folded, the edges $8^a$ will rest on the edges $9^a$. At the end of the folding operation, the side-flaps 10 will embrace the side-flaps which comprise the sections 8 and 9. It is preferred to provide one of the sections of the blank, as for example, the free edge of the section 6, with a tab $6^a$, which may be used as a separator between the upper edge of the zinc can and the cell connection, or conductor connecting the cells. The blank is shown scored along the line $6^b$, thus facilitating the bending over of the tab.

The individual cell-containers are nested in rows in the box A; the cells are then introduced into the individual containers; and the cells are then connected by wires, or conductors, 11, the tabs $6^a$ being bent over and interposed between the wires and the upper edges of the zinc cans.

The zinc cans are introduced into the individual cell-containers without any wrapping. The cardboard from which the blank is formed preferably is impregnated with a compound which is of insulating and waterproofing character, such as creosote, paraffin, or a solution of asphaltum. The cell-containers may be arranged in the main container A in such a manner as to enable a tab $6^a$ to be interposed between each wire conductor and the upper edge of the zinc cup from which the conductor must be insulated.

If desired, the cells may be introduced into the individual cell containers before the latter are introduced into the box A.

The battery is completed by pouring in the sealing compound D, which fills the spaces surrounding the cells and the space above the cells, so that, practically speaking, the cells are imbedded in the sealing compound.

Figure 8:
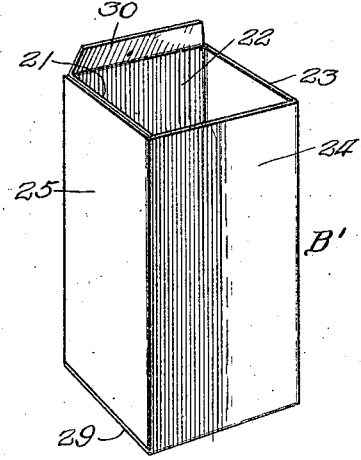

In Figs. 6-8, B' designates a modified form of individual cell-container. This container preferably is formed from a rectangular strip of light cardboard which is provided with projections, as shown in Fig. 6. The piece is scored, or weakened, along parallel lines 12, and along lines perpendicular thereto designated 13, 14, 15, 16 and 17. The strip is also incised along lines 18, 19 and 20. Thus, the blank comprises the main sections 21, 22, 23, 24 and 25; short bottom flaps 26 and 27; longer bottom flaps 28 and 29, and an upper tab 30. The process of folding is indicated in Fig. 7; and the completely folded blank, forming the carton, is shown in Fig. 8. In folding the blank, the bottom flap 28 is bent at right angles to the section 22, the sections 21 and 23 are folded so as to be disposed at right angles to section 22, the short flaps 26 and 27 being first bent inwardly so as to overlie the bottom flap 28; the folding is then continued until the section 24 is brought to position opposite the section 22, the bottom flap 29 being bent inwardly so as to lie beneath the bottom flap 28. The folding is completed by causing the section 25 to overlap, or embrace, the section 21. The parts may be cemented together in the folded condition, if desired. Ordinarily, however, this is unnecessary. The individual carton just described can be formed cheaply, and avoids excessive waste of cardboard. Also, such a carton provides for several thicknesses of cardboard at the bottom of the carton, upon which the cell rests, which is desirable in certain types of battery assembly. Such a carton tends to prevent the electrolyte from passing from the bottom of one cell to the bottom of another cell.

The constructions described are simple, cheap and durable.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A battery comprising a main container and individual rectangular cell-containers nested therein, each comprising a folded cardboard blank having an open upper end, unwrapped dry cells in said individual containers, connections between said dry cells, and a sealing compound filling the upper portion of the main container.

2. A battery comprising a rectangular box and rectangular individual cell-containers nested therein, each comprising a folded blank having a bottom wall, a pair of opposed sidewalls connected with said bottom wall, one of said sidewalls having side-flaps provided with beveled lower edges and the other sidewall having side-flaps which embrace said first-named side-flaps, and complemental side-flaps attached to said bottom wall and having beveled upper edges registering with the beveled lower edges of said first-named side-flaps.

3. A battery comprising a rectangular box, rows of rectangular individual cell-containers nested in said box, each cell-container comprising a folded blank and having an open upper end, tabs attached to the upper ends of said cell-containers, dry cells in said cell-containers, connections between said dry cells, said tabs being interposed between said connections and the respective zinc cans of the dry cells from which the connectors must be insulated, and sealing compound in the spaces about said dry cells and filling the space above the dry cells and individual containers.

4. A battery comprising a rectangular box and rectangular individual cell-containers nested therein, each comprising a folded cardboard blank comprising four main sections forming four side-walls, said sections having bottom flaps forming the bottom of the cell-container.

EDWIN E. MEISEKOTHEN.